Nov. 17, 1931. J. BORNSTEIN 1,832,084
WIPER MECHANISM FOR WINDSHIELDS AND THE LIKE
Filed Sept. 7, 1929 4 Sheets-Sheet 2
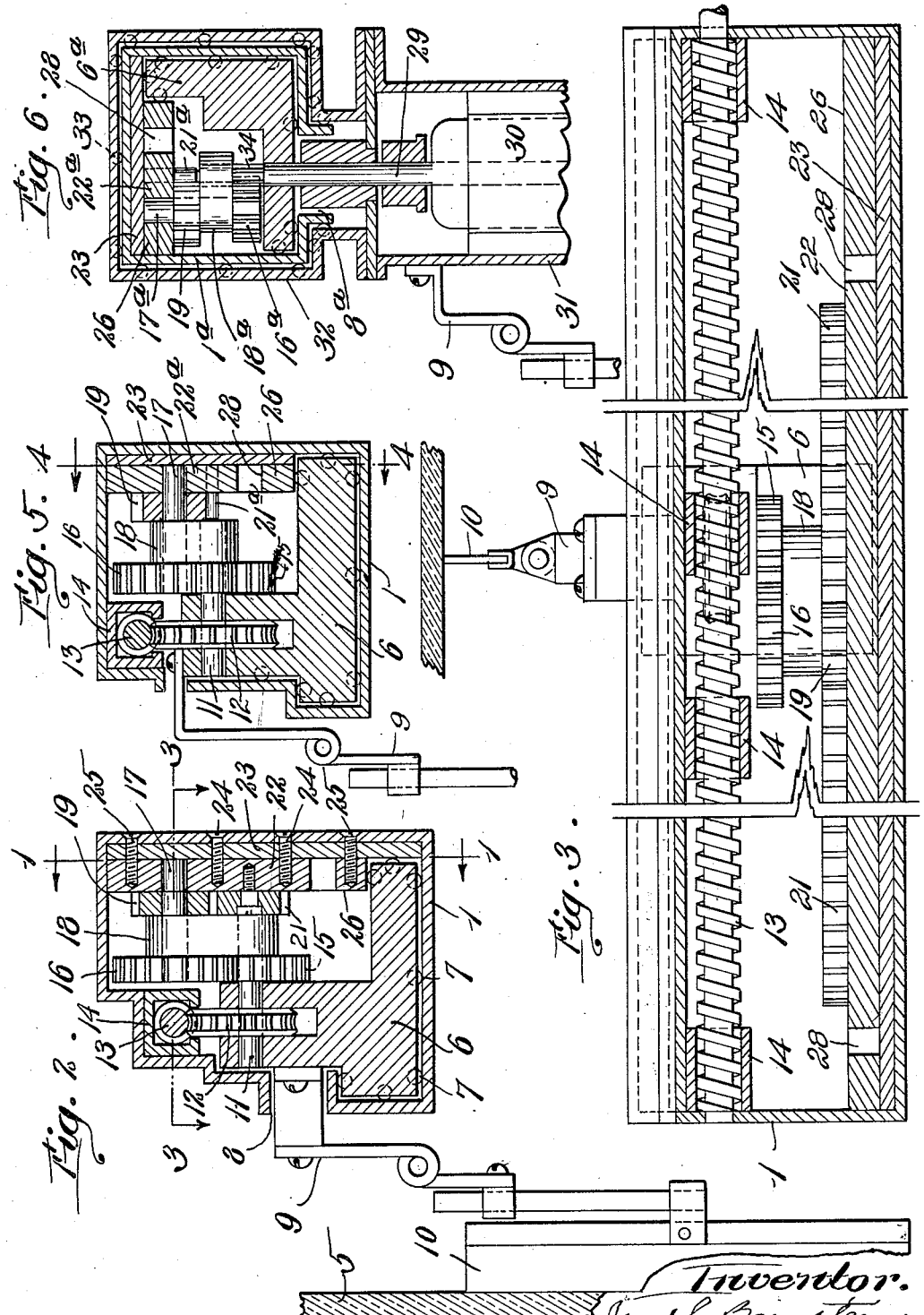
Inventor.
Joseph Bornstein,
by Arthur E. Randall Atty.

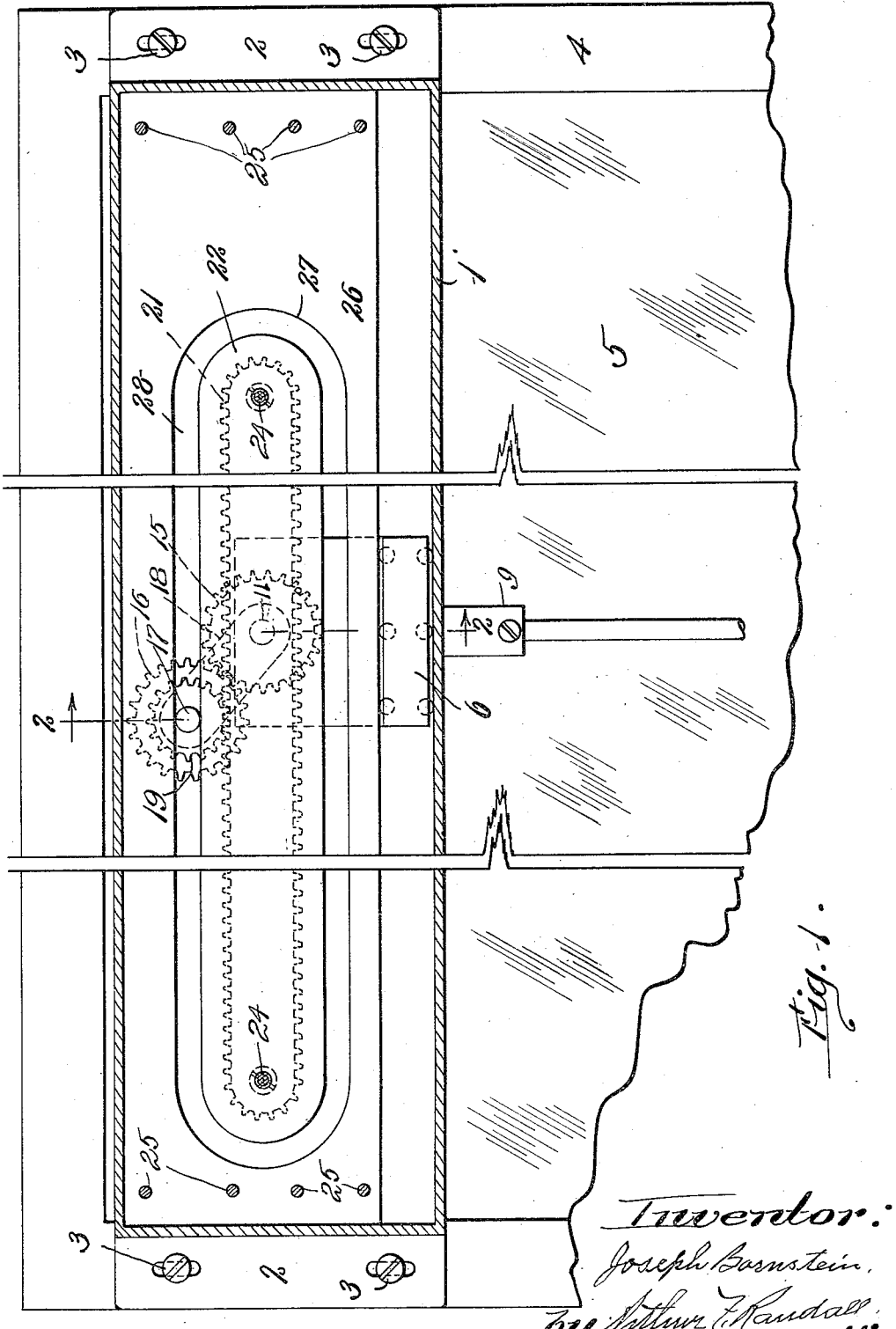

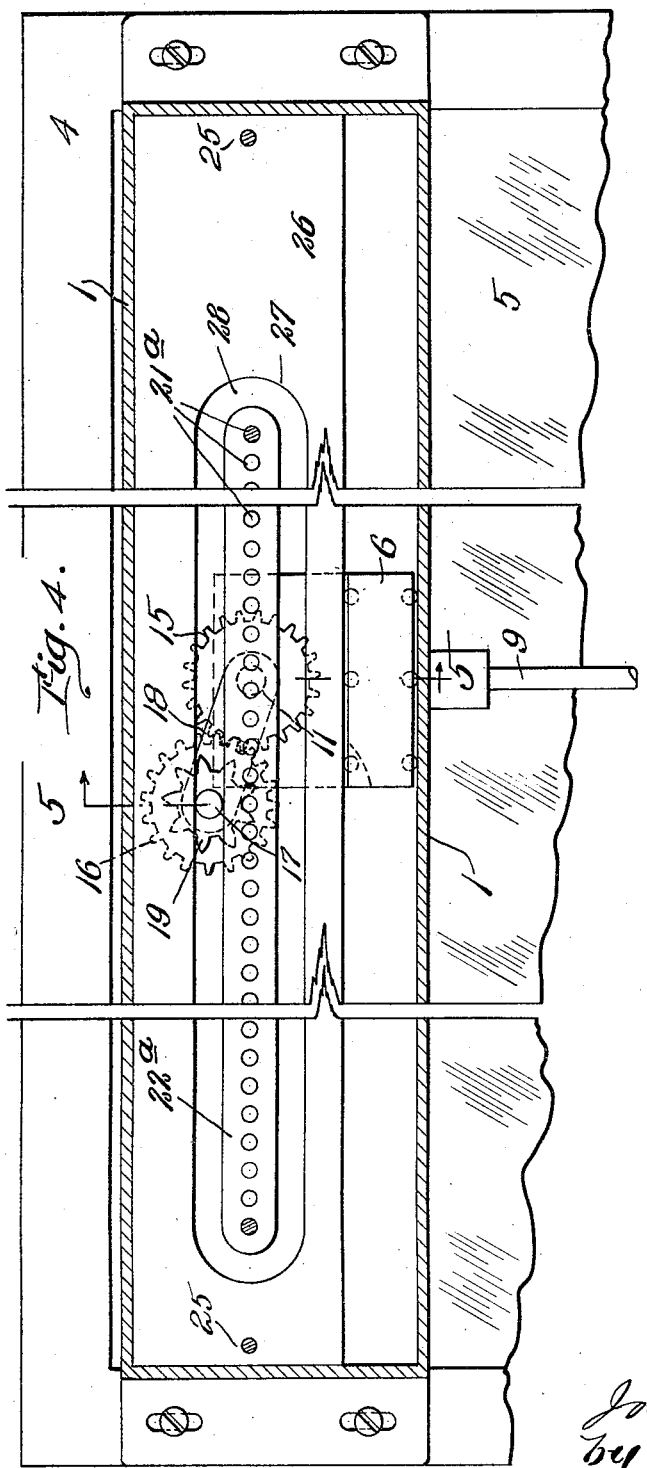

Nov. 17, 1931.   J. BORNSTEIN   1,832,084
WIPER MECHANISM FOR WINDSHIELDS AND THE LIKE
Filed Sept. 7, 1929   4 Sheets-Sheet 4
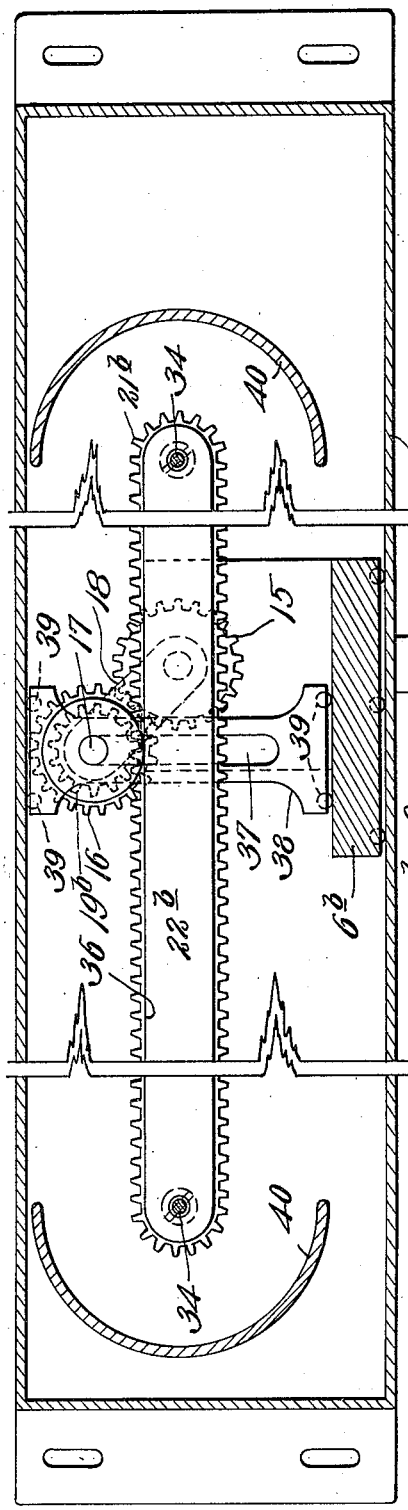
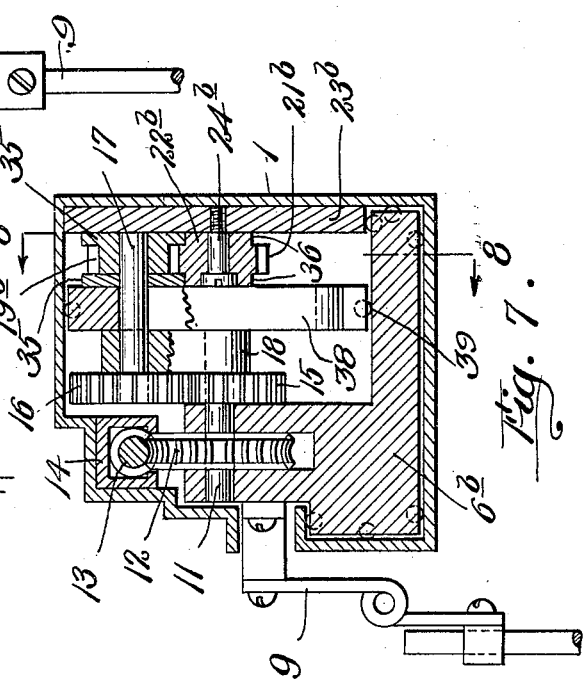
Inventor.
Joseph Bornstein,
by Arthur E. Randall.
Atty.

Patented Nov. 17, 1931

1,832,084

UNITED STATES PATENT OFFICE

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed September 7, 1929. Serial No. 390,893.

My invention relates to wiper or cleaning mechanisms for windshields, windows and the like, and it has for its object to improve the construction thereof and to provide a mechanism of this class which will be of simple, efficient and inexpensive construction.

To these ends I have provided a mechanism of the class described having the peculiar features of construction and mode of operation set forth in the following description, the several novel features of the invention being particularly pointed out and defined in the claims at the close thereof.

In the accompanying drawings:

Figure 1 is a front elevation of the upper portion of a windshield equipped with a wiper mechanism constructed in accordance with my invention, said mechanism being shown in section on the line 1—1 of Fig. 2.

Figure 2 is a section on line 2—2 of Fig. 1.

Figure 3 is a section on line 3—3 of Fig. 2.

Figure 4 illustrates a modification of the form of my invention shown in Figs. 1 to 3, inclusive.

Figure 5 is a section on line 5—5 of Fig. 4.

Figure 6 is a cross sectional view of a wiper mechanism illustrating a modification wherein a driving motor is provided that is supported by the wiper carrier.

Figure 7 is a cross sectional view illustrating another form of wiper mechanism.

Figure 8 is a section on line 8—8 of Figure 7.

The form of my invention illustrated in Figs. 1, 2 and 3 includes a tubular sheet metal frame 1 that is rectangular in cross section as shown in Fig. 2 said frame being provided at its opposite ends with apertured lugs 2 fastened by screws 3 to the frame 4 of a windshield in front of the glass pane 5 of the latter.

Within the tubular frame 1 is movably mounted a wiper carrier 6 made upon its exterior with sockets within which are located anti-friction balls 7 having rolling contact with the interior of frame 1. The frame 1 is formed upon its rear side with a longitudinal slot 8 through which projects the stem 9 of a wiper element 10 that is yieldingly held against the glass pane 5 of the windshield, said stem being fastened to the carrier 6.

Journaled in bearings on carrier 6 is a shaft 11 carrying a worm wheel 12 that is engaged by a worm shaft 13. This worm shaft 13, Figs. 2 and 3, is journaled in bearings provided on frame 1 at the opposite ends of the latter and is also supported intermediate its ends by isolated bearing blocks 14 fastened in position within the tubular frame 1. At one end thereof the worm shaft 13 extends beyond the frame 1 and is adapted to be connected with any suitable means by which it is continuously rotated in one direction. The means for driving the worm shaft 13 may be an electric motor such as is commonly employed in mechanisms of this type, or said shaft may be connected by a flexible shaft with a rotating part of the vehicle on which the mechanism is used.

The shaft 11 also has fixed on it a spur gear 15 which continuously drives a spur gear 16 fast on a short shaft 17 that is journaled in a bearing provided adjacent the free or outer end of a link member 18 which is pivotally mounted adjacent its opposite end upon the shaft 11.

The short shaft 17 also has fixed thereon a toothed wheel or gear 19 that is in mesh with an endless rack of teeth 21 provided upon a plate 22 that is fastened in position upon a base plate 23. Base plate 23 and rack plate 22 are fastened together and to the front wall of the frame 1 by screws 24. The base plate 23 also has fastened to it, by means of screws 25, another plate 26 formed with an opening 27 therein within which the rack plate 22 is centrally disposed. The rack plate 22 is made smaller than the opening 27 thereby providing a runway or groove 28 into which projects one end of the shaft 17 as shown in Fig. 2. This runway is parallel with the rack of teeth 21 and provides an endless guide slot for the shaft 17.

When the mechanism is in operation the worm shaft 13 is continuously driven in one direction and operates through worm wheel 12, shaft 11, gears 15 and 16, and shaft 17 to continuously rotate the toothed wheel 19 in one direction and the latter is thereby caused to traverse the endless rack of teeth 21. As the toothed wheel 19 travels along the toothed rack 21 it acts through the link 18 to move the carrier 6 with it thereby reciprocating said carrier and moving the wiper element 10 back and forth across the windshield pane 5, the opposite side walls of the runway 28 serving to guide the shaft 17 so as to maintain the toothed wheel 19 properly in mesh with the rack 21.

In the form illustrated in Figs. 4 and 5 the rack 21a that is traversed by the continuously rotating toothed wheel 19 is constituted by a single row of studs or pins projecting from a plate 22a secured in position upon base plate 23 within the aperture 27 of the outer plate 26, said outer plate 26 being also fastened as before to the base plate 23. Otherwise the construction is approximately the same as described in connection with Figs. 1, 2 and 3.

In the form illustrated in Fig. 6 the tubular frame has its bottom wall made with a longitudinal slot 8a and the base plate 23 with the parts 22a and 26 mounted thereon, is fastened to the top wall of the frame 1a.

The wiper carrier of Fig. 6 includes a section 6a made with a bearing through which extends a vertically disposed armature shaft 29 of a motor 30, said motor being fastened in position within a housing 31 which is supported by a strap or belt 32 extending around the tubular frame 1a, said strap or belt 32 being made upon its interior with sockets each holding an anti-friction ball 33 bearing against the exterior of frame 1a. Adjacent its upper end the armature shaft 29 is formed with a pinion 34 in mesh with a gear 16a fast on one end of a short shaft 17a that is journaled in a bearing provided adjacent one end of a link 18a. The opposite end of this link 18a is pivotally mounted upon the upper end portion of the armature shaft 29.

The upper end of the short shaft 17a projects into the endless runway 28 provided by, and between, plates 22a and 26 as in the case of the form shown in Fig. 4.

The stem 9 of the wiper element is fastened to the motor housing 31 and when the motor is in operation it acts through gear 16a, shaft 17a, and the toothed wheel 19 fast on said shaft, to continuously reciprocate the carrier section 6a, the latter operating through the armature shaft 29 to move motor housing 31 and strap 32 with it, thereby carrying the wiper element back and forth across the windshield.

In the form of my invention shown in Figs. 7 and 8 the wiper carrier 6b has journaled upon it a shaft 11 carrying a worm wheel 12 that is continuously driven in one direction by a worm shaft 13, and on this shaft 11 is also fastened a spur gear 15 driving another spur gear 16 fast on the short horizontal shaft 17. This short shaft 17 is journaled in a bearing provided near the free end of a link 18 which is pivotally mounted at its opposite end upon the shaft 11 as in Figs. 1 and 2. The short shaft 17 also carries a toothed wheel 19b meshing with an endless rack of gear teeth 21b provided upon a plate 22b that is fastened by screws 24b to a base plate 23b which in turn is fastened to the front wall of the tubular frame 1. The toothed wheel 19b is provided upon opposite sides thereof with circular flanges 35 bearing against endless tracks 36 formed on the plate 22b.

As in Figs. 1 and 2 the wiper element of the form shown in Figs. 7 and 8 has its stem 9 fastened directly to the carrier 6b.

The short shaft 17 of Fig. 7 extends through a vertical slot 37 formed in a stop member 38, the opposite ends of said slot 37 serving as stops which, by engagement with the shaft 17, serve to hold the circular flanges 35 in engagement with the endless tracks 36 at all times except while the toothed wheel 19b is passing around the ends of the plate 22b.

The bar 38 is made at its lower end with pockets within which are seated anti-friction balls 39 having rolling engagement with the carrier 6b while the upper end of said bar is likewise provided with anti-friction balls 39 having rolling engagement with the inner side of the top wall of the frame 1.

When the mechanism of Figs. 7 and 8 is in operation, the continuously driven worm shaft 13 acts through worm gear 12, shaft 11, gears 15 and 16 and shaft 17 to continuously rotate the toothed wheel 19b in one direction with the result that the latter traverses the rack of teeth 21.

As the wheel 19a nears either end of the plate 22b the circular flanges or wheels 35 enter into engagement with an arcuate track 40 projecting from the base plate 23b, said track serving by its engagement with the flanges 35 to maintain the toothed wheel 19b in proper engagement with the rack 21 while said toothed wheel is passing around the end of the plate 22b.

As the toothed wheel 19b swings around either end of the plate 22b the link 18 is swung on the axis of the shaft 11 and the shaft 17 is shifted from one end of the slot 37 into position against the opposite end thereof. During this bodily movement of the shaft 17 from one end of slot 37 to the opposite end thereof, the stop member 38 is shifted back and forth sidewise on the carrier 6b. Thus the member 38 serves to hold the toothed wheel 19b in proper engagement with the rack 21 while said wheel is traveling from one cam track 40 to the opposite cam track 40.

All of the above described forms of my invention include a stationary endless rack around which travels a continuously driven pinion or toothed wheel that is mounted upon the same carrier which supports the wiper element.

What I claim is:

1. In a windshield wiper, in combination, a frame; a carrier movably mounted upon said frame; a wiper element connected with said carrier; a fixed rack of teeth on said frame; a toothed wheel rotatably mounted on said carrier and engaging said rack, and means for continuously rotating said wheel in one direction to cause the same to traverse said rack thereby to reciprocate said carrier and wiper element.

2. In a windshield wiper, in combination, a frame; a carrier movably mounted upon said frame; a wiper element connected with said carrier; a fixed endless rack of teeth on said frame; a toothed wheel rotatably mounted on said carrier and engaging said rack, and means for continuously rotating said wheel in one direction to cause the same to travel around said rack thereby to reciprocate said carrier and wiper element.

3. In a windshield wiper, in combination, a frame; a carrier movably mounted upon said frame; a wiper element connected with said carrier; a fixed rack of teeth on said frame; a toothed wheel rotatably mounted on said carrier and engaging said rack, and means for operating said wheel to cause the same to travel around said rack thereby to reciprocate said carrier and wiper element, said operating means including a shaft journaled on said frame that is continuously driven in one direction and means on said carrier through which said shaft operates to rotate said toothed wheel continuously in one direction.

4. In a windshield wiper, in combination, a frame; a carrier movably mounted upon said frame; a wiper element connected with said carrier; a fixed rack of teeth on said frame; a shaft journaled on said carrier that is continuously driven in one direction; a link member pivotally mounted upon said shaft; a toothed wheel journaled on said link member and engaging said rack, and means through which said shaft operates to continuously drive said toothed wheel in one direction thereby to cause the latter to travel around said rack.

5. In a windshield wiper, in combination, a frame; a carrier movably mounted upon said frame; a wiper element connected with said carrier; a fixed rack of teeth on said frame; a shaft journaled on said carrier that is continuously driven in one direction; a link member pivotally mounted upon said shaft; a toothed wheel journaled on said link member and engaging said rack; means through which said shaft drives said toothed wheel; and means for guiding said toothed wheel in its travel around said rack.

6. In a windshield wiper, in combination, a frame; a carrier movably mounted upon said frame; a wiper element connected with said carrier, a fixed rack of teeth on said frame; a shaft journaled on said carrier; a link member pivotally mounted on said shaft; a toothed wheel rotatably mounted on said link member and engaging said rack; means through which said shaft drives said toothed wheel to cause the latter to travel around said rack; means to guide said toothed wheel during its travel around said rack; a worm shaft journaled on said frame that is continuously driven in one direction and a gear on said first-mentioned shaft that is engaged and driven by said worm shaft.

7. In a windshield wiper, in combination, a frame; a carrier movably mounted upon said frame; a wiper element connected with said carrier; a shaft journaled on said carrier; a link member pivotally mounted on said shaft; a fixed endless rack of teeth on said frame; a toothed wheel journaled on said link member and engaging said rack; means through which said shaft drives said toothed wheel to cause the latter to travel around said rack; means for guiding said toothed wheel during its movement around said rack; a worm shaft journaled on said frame that is continuously driven in one direction, and a worm gear fast on said first-mentioned shaft and continuously driven in one direction by said worm shaft, said worm shaft being parallel with the path of said carrier.

Signed by me at Boston, Suffolk County, Massachusetts, this 31st day of August, 1929.

JOSEPH BORNSTEIN.